3,511,666
METHOD OF MAKING A PELLETIZED
COFFEE BREWING PACKAGE
Robert A. Hudson, White Plains, and Willie J. Richards, Ossining, N.Y., and Gary V. Jones, Bergenfield, N.J., assignors to General Foods Corporation, White Plains, N.Y., a corporation of Delaware
No Drawing. Filed Jan. 11, 1967, Ser. No. 608,502
Int. Cl. A23f 1/00
U.S. Cl. 99—77.1  2 Claims

ABSTRACT OF THE DISCLOSURE

Roasted and ground coffee is degassed and compressed to form a pellet. The pellet is packaged loosely in a porous filter bag.

BACKGROUND OF THE INVENTION

This invention relates to an improved preparation of freshly roasted coffee in a filter device suitable for percolation, or other brewing technique.

The prior art has recognized the advantages of compressed R&G coffee tablets or wafers for brewing coffee. The advantage of such tablets is that a uniform measure of coffee is provided each time for percolation. Disadvantages of the tableted R&G coffee has been the fact that the high compressive forces needed to form a strong tablet releases coffee lipids from the coffee beans and thereby introduces an undesirable oil slick and a turbid appearance in the coffee cup. An additional disadvantage is the need to dispose of messy, spent grounds due to disintegration of the tablet into loose coffee particles on percolation.

The prior art has also recognized the advantages of simply placing R&G coffee (loose) in a disposable filter bag or coffee cartridge and then brewing this coffee to provide a clearer and cleaner brew with the added convenience of uniform premeasurement and no spent grounds disposal problem. However, there are complex manufacturing problems in placing loose coffee within a filter bag. For example, by placing ground coffee in a loose form in a filter bag with the large pores needed for effective extraction, normal vibration during handling, packaging, and shipment will cause the small particles of coffee (fines) to filter through the bag causing dusting problems. On the other hand, when loose coffee is placed in a filter bag with pores small enough to retain the fines, it is found that the extractability of the coffee is seriously impeded, thus decreasing the quality of the product unless additional quantities of coffee are added or the brewing time extended.

The use of tablets or pellets in combination with a porous filter bag overcomes the difficulties encountered by the naked tablets or the filter bags containing loose coffee.

ADVANTAGES AND OBJECTS

It is a principal object of this invention to provide a coffee cartridge or filter bag which will not "dust" prior to percolation but which has sufficient porosity for efficient extraction of coffee solids and flavor without experiencing loss of grounds.

It is another object of this invention to produce a cleaner, clearer brew of coffee containing less coffee oil.

Another object of this invention is to avoid excessive deposition of coffee oil on the inside of the coffee pot during percolation, this oil being difficult to remove completely and causing off-flavors on reuse of the percolator.

Still another object is to improve the manufacture of coffee cartridges by having the R&G coffee in pellet form, thus avoiding many of the problems inherent in placing loose coffee in a porous filter bag.

Still another object is to avoid fissures in the coffee pellets by degassing the coffee prior to pelletizing.

Still other objects and advantages will appear from the following description of this invention.

DESCRIPTION OF THE INVENTION

It has now been discovered that filter bags with large pore sizes can be used for extraction of freshly roasted coffee solids if the R&G coffee is formed into a pellet prior to being placed in the filter bag. By pelletizing or tableting the coffee, filter pores or holes of between 0.01" and 0.1", and preferably 0.03" to 0.07" in diameter, can be used to achieve effective extraction during brewing without undergoing loss of grounds through the filter. "Dusting" is prevented prior to percolation by compression of the R&G coffee pellets. While the pellets break up during brewing, migration of grounds into the brew is prevented due to swelling of the R&G particles upon contact with the hot water.

The pellet is formed of compressed coffee particles under sufficient pressure to hold the coffee in the form of a doughnut-shaped tablet, wafer or other desired shape and being capable of releasing at least 10% more extractable solids than an equivalent charge of fresh R&G coffee. In doing this, the initial volume of R&G coffee is reduced to between 25% and 40%, preferably 30–35%, of the initial charge volume. However, the coffee particles should not be disrupted to the extent that coffee lipids are expressed thereby introducing an undesirable oil film or slick in the percolated brew.

More particularly, it has been found that a coffee pellet or tablet essentially free of extruded oil, coffee "fines," and fissures can be made by roasting the green coffee, grinding, and then sufficiently degassing the coffee for the pelletizing operation. The coffee is then compressed into pellets at a critical pressure of between 8,000 to 16,000 p.s.i., the application of said pressure being controlled to yield a pellet of sufficient hardness to prevent breakage but not so great as to cause pellet capping. The actual pressure used will vary with the temperature and moisture of the coffee, the blend, the rate or speed of pelletizing and the amount of degassing. However, within this pressure range an R&G pellet can be produced which retains its shape and form during packaging and distribution.

In the above compression operation, the soluble solids extraction yield can be increased by 10–20% to give a stronger cup of coffee when compared to an equivalent charge of freshly roasted and ground coffee. However, this increased yield is generally offset by the pore size of the filters which must be sufficiently meshed to retain the coffee grounds during percolation. The end result is an extraction of the pelletized package similar to that of loose coffee without a filter bag. More importantly, the compression step allows pellets of R&G coffee to be packed in highly porous filters which would not effectively retain all the particles of coffee during distribution thus presenting "dusting" problems in the container.

Grinding of the roasted coffee is not critical and conventional particle size distributions may be used in making the pellets. A suitable distribution is one wherein about 85% of the coffee particles are between 12 and 30 mesh U.S. Standard Screen sieve and about 15% are less than 30 mesh. In this distribution, some of the particles of coffee are smaller than 0.01" in diameter and if not pelletized would freely pass through the openings of any filter material capable of providing good extraction rates on percolation since such material would, by necessity, have holes greater than 0.01″ in diameter.

However, degassing of the coffee after grinding is critical. Freshly roasted coffee beans contain roughly about 2,000 cc. of gas, chiefly $CO_2$, for each pound of coffee. However, about 300 cc. of this gas is not normally released from the bean regardless of the time of storage or the conditions. This leaves roughly 1,700 cc. of releasable gas present in each pound of fresh roasted coffee. Grinding of the beans causes a loss of about 900 cc., leaving 800 cc. still present in the coffee. It has been found that at least 25% (200 cc.) and preferably about 40% (320 cc.) of this gas must be removed prior to pelletizing or fissures will occur in the pellets and thereby render the final product useless. Degassing to the required extent may be done by various techniques. The coffee may be simply aged at room temperature for about 3–5 hours after grinding. This will release about 300 cc. of $CO_2$ and assure production of a fissure-free pellet at the pressures employed. Alternatively, more accelerated degassing techniques may be used, such as, hot grinding, use of further mechanical pressure after grinding (crushing rolls), heat treatments short of roasting (either with moisture or without), application of vacuum to the R&G coffee to accelerate gas release, etc. Fine grinding may also be utilized for degassing but then difficulty could be encountered in retaining the small grind within the filter bag on percolation. Many other techniques are available and known in the art. The critical thing is that the R&G coffee be substantially degassed prior to pelletizing and this means more than the conventional 10–15% degassing of fresh R&G coffee prior to normal packaging.

The fresh R&G, when degassed, is then pelletized to withstand the rigors of packaging, shipment and other handling as described above and is then ready to be wrapped or enclosed within the highly porous filter bag of this invention.

The filter bag material which is used to enclose the coffee pellet can be made of any non-toxic, relatively tasteless or bland, insoluble material. Any material or synthetic material, or combination thereof having sufficient porosity for extraction and which meets the above specifications, can be used. This would include material made from natural fibers (cotton gauze); woven and non-woven fibers made of polymeric material such as, viscose rayon (regenerated cellulose), nylon, polyesters (polyethylene, polypropylene), and acrylics; plastic films or metal foil made of polyethylene, polyvinyl chloride, cellophane, regenerated cellulose, polyvinyl alcohol, aluminum foil, etc., (the film or foil being merely perforated to the porosity necessary to accomplish complete extraction). The material should have sufficient porosity to allow substantial extraction of the R&G coffee and substantial migration or "dusting of R&G coffee particles through the pores of the bag when said coffee is in dry loose form but insufficient to allow migration of the roasted coffee particles from inside the bag during percolation due to swelling of the coffee particles on contact with the hot water at percolating temperatures. This will require perforations having a diameter of 0.01″ to 0.1″, preferably 0.03″ to 0.07″. Generally, pore sizes above 0.01″, and preferably 0.03″, give relatively unimpeded extraction on percolation while sizes of more than 0.1″, preferably 0.07″, will have difficulty retaining the coffee particles which have swelled (due to percolation) inside the filter bag. Roughly, the porosity of the bag will conform to between an 8 to a 60 mesh (U.S. Standard Sieve Series) screen and preferably to a mesh size of between 14 and 20 mesh. The percent open area can range from 10% to 90%.

The pellet or pellets of coffee should be packed initially in a manner which assures at least 30%, preferably 50%, void space inside the filter bag material. Where the material is non-stretchable on percolation (cotton), even more void space may be necessary. This is necessary to achieve proper circulation of the water through the bed of coffee during the brewing cycle. If less than 30% void space is present in the filter bag, the pellets on wetting will swell into a compact bed which will not allow proper extraction of coffee solids. In extreme cases, the bag itself may rupture since the coffee particles swell to about twice their size.

In the case where the pellet takes the form of a tablet, disk, or wafer, it simply may be wrapped in the filter material by placing the tablet between two sheets of the filter material and then sealing the edges so as to allow about 50% of void space inside the percolator package. The tablet may be perforated or hollow to provide sufficient void space for the brewing package. In the case of a doughnut-shaped tablet, the center is also sealed. The filter material may include a binder (which is also tasteless, or bland, non-toxic, and capable of withstanding percolation temperatures) to aid in the sealing operation. The binder can also be used in bonding the individual fibers to one another in the case where a fibrous filter material is used. However, in cases where the fibers form a good seal by themselves the binder may be omitted. The fabric or filter material may then be cut around its outer periphery seal while in the case of a doughnut-shape the inner periphery can merely be cut or slit into an X pattern or similar design to assure a tight fit with the percolator spout.

In the case of doughnut-shaped percolator packages, it has been found that the filter bag will not achieve good extraction during percolation unless the coffee and filter actually contact the percolator spout. Preferably, the filter material should not only merely touch the spout, but it should form an intimate or tight contact which assures a trapping of the percolating water issuing from the top of the spout and avoids serious bypass of the coffee. Since most spouts are about $3/16''$ to $9/16''$ in diameter, the inner seal should be about $1/2''$ to $3/4''$ in size and so cut as to allow a snug contact with the spout.

The end result of this operation is a unique percolator package having filter holes of such size that the particles of R&G coffee could easily migrate or "dust" to the outside (prior to brewing) were it not for the pelletizing operation whereas the particles, upon contact with hot water, swell and cohere into a wet bed to an extent where migration through the holes is virtually eliminated during the brewing cycle.

It is understood that the percolator package described herein can be used not only in the conventional basket-type percolator but is also adaptable to being directly immersed in the brewing liquid. It is evident that where the temperature of the extraction water is insufficient to obtain full brew strength that this may be compensated by addition of appropriate amounts of soluble coffee to the pellets or tables.

This invention will now be described by reference to several specific examples.

EXAMPLE 1

Freshly roasted coffee was ground to a particle size distribution wherein at least 85% (by weight) of the coffee was between 12 and 30 mesh (U.S. Standard Sieve). In this distribution about 1–5% of the coffee was less than 0.01″ in diameter and at least 30% was less than 0.03″ in diameter, and no particle of coffee was greater than 0.06″ in diameter. The coffee was held under ambient conditions for at least 4 hours to obtain substantial degassing (about 300 cc./lb. of the releasable gas). Then, a 34 gram charge of coffee was placed in a doughnut-shaped cylindrical die having an outer diameter of about 2.7″ and an inner diameter of about 1″, and compressed at a pressure of 12,000 p.s.i. for 0.1 second. This reduced the charge of coffee from a height of about 1.5″ to 0.5″. The final tablet did not have any extruded oil or wax visibly present at the surface. No fissures were present in the tablet due to excessive gas release during tableting.

These tablets were then placed between 2 sheets of polyethylene film having at least 80 perforations of 0.04" size diameter for each square inch of film and the film was impulse heat-sealed around the peripheral portions of the doughnut. At least ½" was left at these peripheral portions to allow for bean expansion on percolation thus giving a tablet fill corresponding to about 50% of the total void volume prior to bean expansion. The bag was cut around its outer periphery but merely slit in a X pattern inside the inner periphery to thereby assure good contact and wetting of the cartridge around the stem. The tableted coffee cartridges were vacuum-packed in cellophane packages (in pairs) and placed within suitable cans or packages for shipment and storage did not experience any "dusting" of coffee particles or rupture of the envelopes. Two cartridges, when taken from the cellophane protective envelope and placed in a suitable stove-top percolator and perked for 5–9 minutes with 1333 cc. of water gave eight cups of a robust coffee brew similar to that from a corresponding charge of fresh R&G in loose form but which was cleaner, clearer, and had less oil. Solids content and flavor was similar to the conventional brew. No significant migration of coffee through the filter was noted during percolation and the walls of the percolator vessel had less of the typical residual oil film deposited by conventional coffee.

EXAMPLE 2

The procedure of the above example was followed in regard to forming the doughnut-shaped coffee tablets. These tablets were placed in a non-woven fabric made of mixed polymeric fibers with a coating of non-toxic, bland resin binder. The fiber portion was 75% viscose rayon (regenerated cellulose) fibers and 25% polypropylene fibers. The porosity, while difficult to define due to the fibrous nature of the material, corresponded roughly to a 16 mesh (U.S. Standard Sieve) screen with pores or holes of about 0.03" in size. This fabric was heat-sealed at the edges to provide about 0.5" space for the coffee to expand toward both the inner seal and outer seal. This product when packed in a conventional 1 lb. coffee can and distributed in normal commercial channels, experienced no "dusting" etc. while giving a cleaner, clearer cup of fresh coffee which compared favorably to the Example 1 control. Extraction of solids was similar to the control.

EXAMPLE 3

A pot containing 1333 cc. of water was placed on a stove and heated to bring the water to a boil. The heat was then adjusted such that the water was simmering gently and two tablets prepared as in Example 2 were completely immersed in the simmering water. After 7 minutes the heat was shut off and the tablets removed. The resulting brew compared favorably to a fresh brewed cup used as the control.

EXAMPLE 4

In order to illustrate the advantages of the tableted coffee cartridge of this invention, several control samples of R&G coffee were prepared in both the loose form and the tableted form. The charge of coffee in each sample was 34 grams and the particle size distribution was the same as in Example 1.

In Sample 1, the coffee was placed loose in tea bag filter paper having pores of less than 0.01" (0.002" to 0.006"). In Sample 2, the same paper was used but with a charge of tableted coffee, the tablet being made according to Example 1.

Sample 3 was a charge of loose coffee in the filter material of Example 2, having pores of about 0.03". Sample 4 was the Example 2 product.

Same 5 was a 34 gram charge of loose coffee without the filter bag while Sample 6 was a 34 gram charge of tableted coffee without the filter bag.

Each sample of brewed coffee was prepared by using 68 gms. of coffee in an electric percolator (GE Model P-14) with 1333 cc. of water. The following results were obtained.

TABLE

| Sample | Dusting | Soluble solids, percent | Taste | Sediment | Oil |
|---|---|---|---|---|---|
| 1 | NG | 0.80 | Weak | Clear | Clear. |
| 2 | OK | 0.90 | do | do | Do. |
| 3 | NG | 0.95 | OK | do | Do. |
| 4 | OK | 1.05 | OK | do | Do. |
| 5 | | 1.16 | OK | Some | Some. |
| 6 | | 1.30 | Bitter | Excess | Excess. |

It is clear from the above table that only Sample 4 (the tableted coffee cartridge described in Example 2) meet all the requirements in regard to freedom from dusting, sediment and oil while giving sufficient soluble solids for a robust coffee taste without bitterness.

What is claimed is:

1. A process for making a percolator package for use in brewing coffee which comprises degassing freshly roasted and ground coffee to an extent wherein less than 600 cc./lb. of releasable gas is present in the coffee, compressing said coffee at a pressure of between 8,000 and 13,000 p.s.i. for a sufficient period of time to release at least 10% more extractable solids than an equivalent charge of coffee not compressed and retain said coffee in the form of a pellet having substantially no extruded oil, enclosing said pellet in a porous filter bag which is non-toxic, bland-tasting, and insoluble at percolation temperatures; said filter bag having pores of a size between 0.01" and 0.1" in diameter, said pores being sufficient in number to give an extraction rate similar to an equivalent charge of uncompressed roasted and ground coffee using no filter, said filter bag having a volumetric capacity greater than the volume of the enclosed pelletized coffee.

2. The process of claim 1 whreein the roasted and ground coffee is degassed by holding said coffee at ambient conditions for at least four hours.

References Cited

UNITED STATES PATENTS

| 1,903,362 | 4/1933 | McKinnis | 99—65 |
| 2,046,158 | 6/1936 | Gore et al. | 99—152 |
| 2,371,093 | 3/1945 | Willison | 99—66 |
| 2,460,735 | 2/1949 | Carroll | 99—77.1 |
| 3,293,042 | 12/1966 | Eitzen | 99—77.1 |

ALVIN E. TANENHOLTZ, Primary Examiner

S. B. DAVIS, Assistant Examiner

U.S. Cl. X.R.

99—65, 66